US012472771B2

(12) United States Patent
Martin et al.

(10) Patent No.: US 12,472,771 B2
(45) Date of Patent: Nov. 18, 2025

(54) LOCKING SYSTEM FOR A WHEEL HUB

(71) Applicant: Dexter Axle Company LLC, Eikhart, IN (US)

(72) Inventors: Ernest E. Martin, South Bend, IN (US); Scott Siegel, Marietta, GA (US); John R. Jurek, Jr., Osceola, IN (US); Robert Gelven, Northville, MI (US)

(73) Assignee: Dexter Axle Company LLC, Elkhart, IN (US)

( * ) Notice: Subject to any disclaimer, the term of this patent is extended or adjusted under 35 U.S.C. 154(b) by 439 days.

(21) Appl. No.: 18/147,431

(22) Filed: Dec. 28, 2022

(65) Prior Publication Data

US 2024/0217265 A1    Jul. 4, 2024

(51) Int. Cl.
*B60B 27/06* (2006.01)
*B60B 7/00* (2006.01)
*B60B 27/00* (2006.01)

(52) U.S. Cl.
CPC .......... *B60B 27/065* (2013.01); *B60B 7/0013* (2013.01); *B60B 27/0078* (2013.01)

(58) Field of Classification Search
CPC ... B60B 27/0078; B60B 27/065; B60B 27/02; B60B 37/10; B60B 7/00; B60B 7/0013; F16B 39/00; F16B 39/24; F16B 39/108; F16B 39/32; F16B 39/10; F16B 39/103
See application file for complete search history.

(56) References Cited

U.S. PATENT DOCUMENTS

| 3,208,493 | A | * | 9/1965 | Holmes | F16B 39/32 411/948 |
| 5,560,687 | A | * | 10/1996 | Hagelthorn | F16C 19/548 301/124.1 |
| 6,896,463 | B2 | * | 5/2005 | Tuthill | F16C 25/06 411/116 |
| 7,717,525 | B2 | * | 5/2010 | White | F16C 19/52 384/585 |
| 7,927,052 | B1 | | 4/2011 | Varden | |
| 8,469,460 | B2 | | 6/2013 | Martin, III et al. | |
| 11,300,152 | B2 | | 4/2022 | Meckstroth | |
| 2005/0025604 | A1 | * | 2/2005 | Slesinski | F16B 39/108 411/112 |

(Continued)

FOREIGN PATENT DOCUMENTS

WO    WO-9614515 A1 *  5/1996  ............. B25B 13/48

OTHER PUBLICATIONS

European Patent Office, Extended European Search Report Re: Corresponding Application No. 23219075.1-1009, dated Sep. 17, 2024, 10 pages, Munich, Germany.

*Primary Examiner* — Kip T Kotter
(74) *Attorney, Agent, or Firm* — McGarry Bair PC

(57) ABSTRACT

A locking system including a lock washer, a nut, and a retainer which together act to secure a wheel hub to a spindle. The lock washer has a tab which extends through the nut and the retainer, and which wraps around and back over the retainer in order to axially and rotationally secure the retainer. The tab has an initial position that corresponds to an unlocked position and a distal end of the tab extends beyond the hub in the initial position far enough to prevent an end cap from being placed over the tab when the tab is in the initial position. As such, installation of the end cap is not possible until the tab is bent into a locked condition.

16 Claims, 6 Drawing Sheets

(56) References Cited

U.S. PATENT DOCUMENTS

2007/0052287 A1 3/2007 White
2011/0291468 A1* 12/2011 Rieger ................... F16B 39/10
411/209

* cited by examiner

LOCKING SYSTEM FOR A WHEEL HUB

BACKGROUND

A spindle nut locking system is used to secure a wheel hub onto a spindle. A conventional spindle nut assembly typically includes a nut which threads onto the spindle. The nut and multiple washers retain, and also apply a preload to, the inner and outer bearings of the wheel hub. The outer washers are in some cases lock washers designed to prevent loosening of the nut. This can be done by restraining the nut through some retention mechanism that prevents it from loosening. This prevents the hub and wheel from falling off of a vehicle to which it is attached and also maintains the proper preload on the bearings.

The prior art includes multiple mechanisms to prevent loosening of the spindle nut. However, it is possible for a user to install a spindle nut, then install an end cap over the spindle nut and bearings, but do so without installing the lock washer. Thus, using the current mechanisms to retain spindle nuts, it is easily possible to install an end cap that protects and retains bearing grease or oil, yet hide the fact that the lock washer for retaining the spindle nut has not been installed. An unsuspecting end user could potentially use a vehicle in an unsafe condition that dramatically increases the likelihood that the spindle nut could loosen without their knowledge. That unsuspecting user may be the same person who tightened the spindle nut and accidentally left out the lock washer. The end user could also be an entirely different person having nothing to do with installing the spindle nut. Either case may yield problematic outcomes. In a best-case scenario, a loose spindle nut would be discovered at an early stage when bearings had only partially loosened and become wobbly. The result of early detection would be limited to potential bearing and spindle damage that would necessitate replacing parts. The worst-case scenario would be a sudden and catastrophic failure that allows a wheel and spindle to come completely off the vehicle. Such a catastrophic failure could result in a potentially fatal collision and significant vehicle damage.

What is needed in the art is a cost-effective and reliable locking system that makes it impossible to install an end cap over bearings without the safety of a nut locking device that prevents the spindle nut from loosening.

SUMMARY

The present invention is a locking system for securing a wheel hub onto a spindle. The locking system includes a lock washer, a nut, and a retainer which together act to secure the wheel hub assembly. The lock washer has a tab which extends between the spindle and the nut and the retainer. To ensure proper assembly, the tab of the lock washer prevents the end cap from seating in the housing of the wheel hub. Before connecting the end cap to the housing, the tab of the lock washer must be bent so that the tab wraps around and back over the retainer which axially and rotationally secures the retainer and nut and allows the end cap to couple to the housing. The tab is long enough to prevent the end cap from seating in the housing of the wheel hub when it is unbent, and allows seating of the end cap only when the tab is bent to lock the nut.

DETAILED DESCRIPTION

Figure 1:
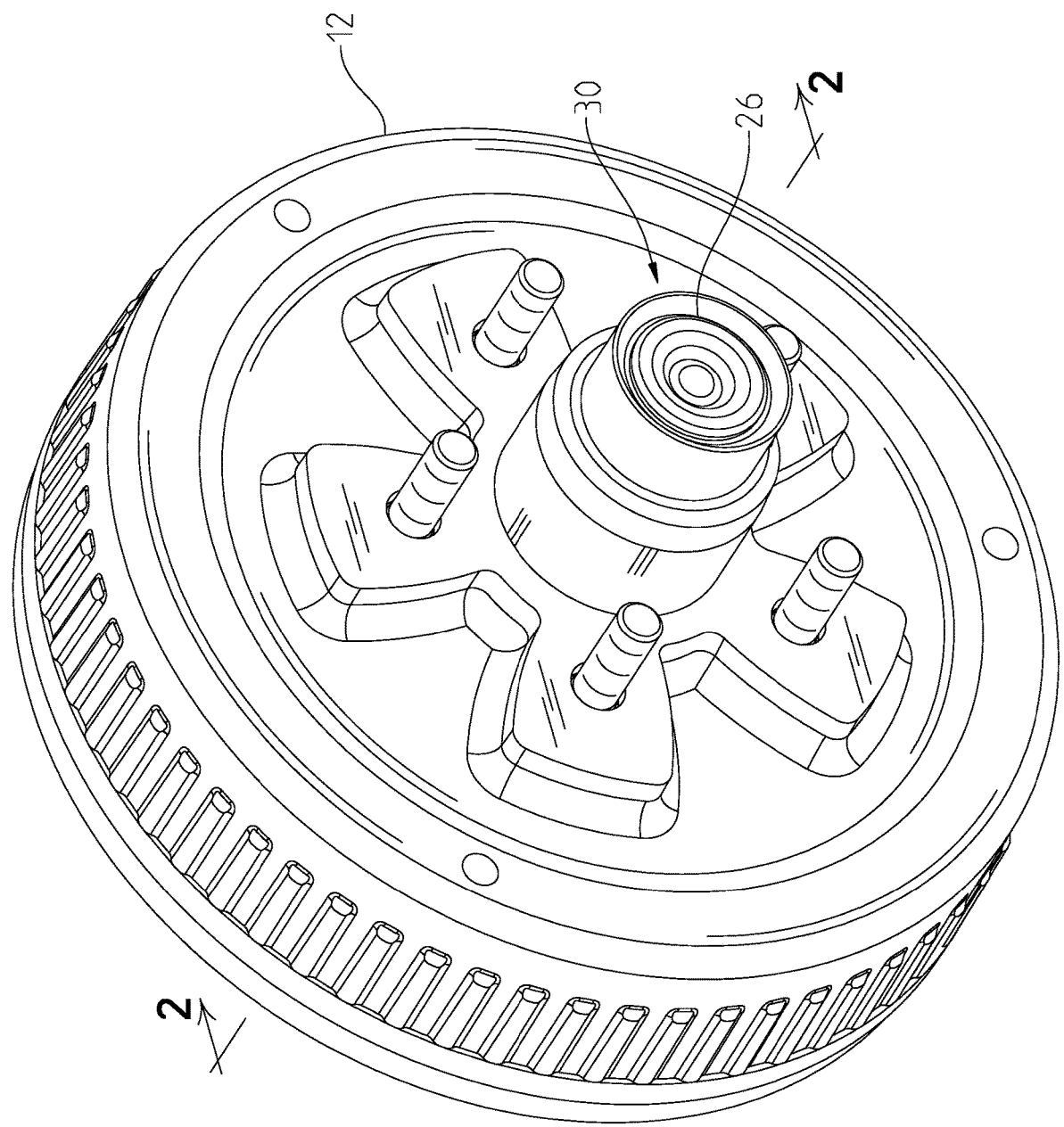
FIG. 1 illustrates a perspective view of a wheel hub assembly.

Referring now to the drawings, and more particularly to FIGS. 1-5, there is shown an embodiment of a wheel hub assembly 10 for supporting a wheel. The wheel hub assembly 10 can be used in vehicles, trailers, aircraft, or other equipment. The wheel hub assembly 10 generally includes a hub 12 that is rotatably supported on a spindle 14. Inboard and outboard wheel bearings 16, 18 circumscribe the spindle 14 and rotate on accompanying journals 20, 22 that are pressed onto the spindle 14. The wheel hub assembly 10 also includes a locking system 30 which threads onto the spindle 14 for securing the wheel hub assembly 10 together and applying a preload on the bearings 16, 18.

Figure 4:
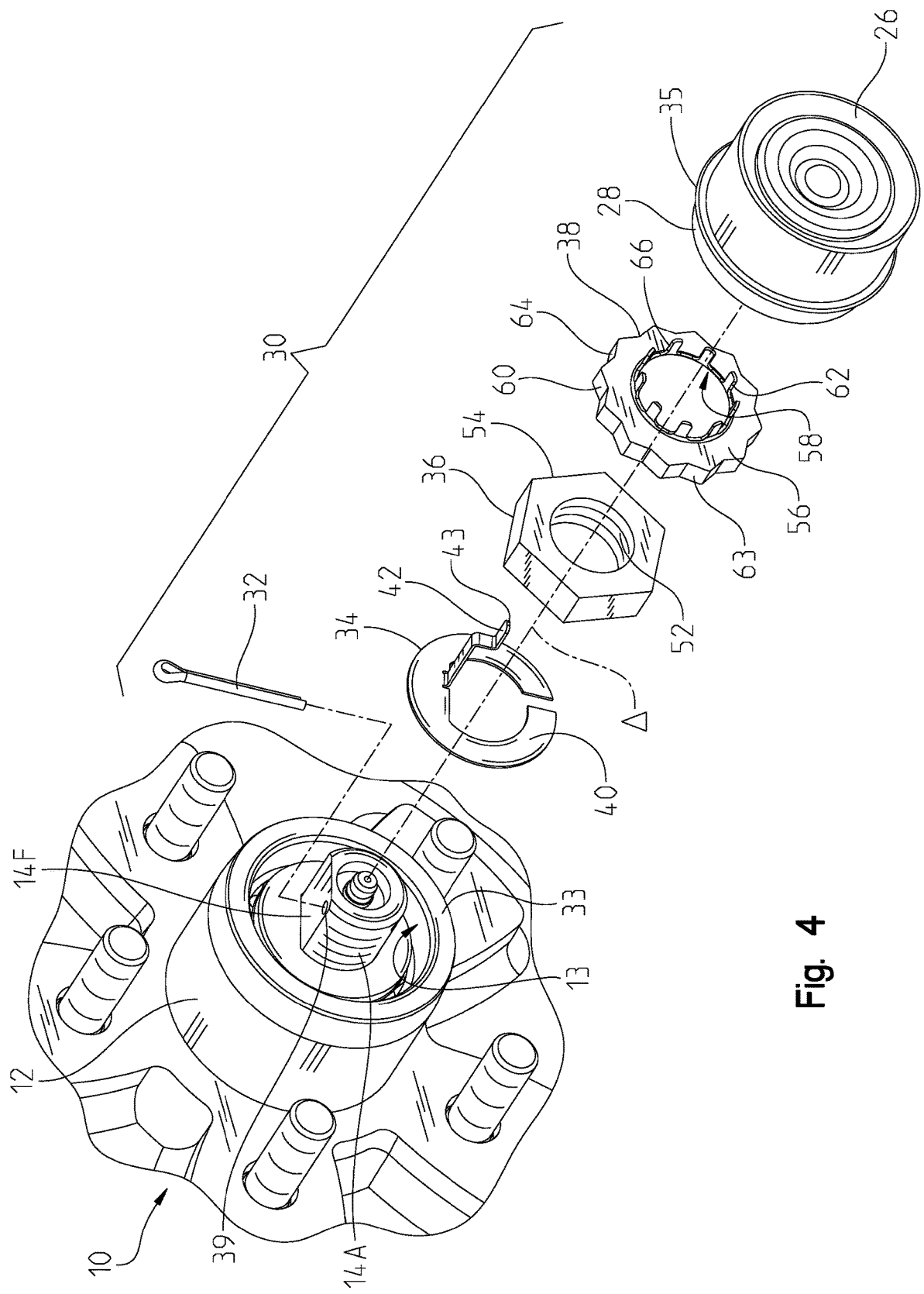
FIG. 4 illustrates an exploded view of the wheel hub assembly.

The hub 12 rotates about the tapered roller bearings 16, 18. The hub 12 includes a housing 24 that circumscribes the spindle 14 and captures grease that lubricates the roller bearings 16, 18. A reservoir 15 is defined by area between the housing 24 and the spindle 14 that has grease therein that is further captured by an end cap 26. The end cap 26 seals and encases the locking system 30 and reservoir 15 upon being coupled to the hub 12. The end cap 26 is press-fit into a counterbore 13 of the housing 24 (FIG. 4). An end surface 33 of the housing 24 forms the outermost extent of the housing 24 and the outermost end of the counterbore 13.

The spindle 14 is configured for receiving the hub 12 and the locking system 30 that is mounted thereon. The spindle 14 defines a longitudinal axis Δ. The spindle 14 end has a cylindrical portion 14A and a flat portion 14F (FIG. 4). In this regard, the spindle 14 end may have a substantially "D" shaped cross-section. The critical feature of the flat portion 14F is that it is radially nearer the longitudinal axis Δ than the cylindrical portion 14A. The flat portion 14F may not necessarily be a "D" shaped cross-section, but may be a keyway within a treaded section. The cylindrical portion 14A in the case shown in FIGS. 2-5 is threaded and the flat portion 14F may be a flat bottom keyway within the cylindrical portion 14A that locates its bottom radially nearer the longitudinal axis Δ than the cylindrical portion 14A. Generally, the cylindrical portion 14A is threaded whether the flat portion 14F is a keyway (not shown) or the "D" shape as shown. The flat portion 14F can be substantially parallel to the ground. The flat portion 14F may extend along the length of the end section of the spindle 14. In more detail, the end section of the spindle 14 may be the portion of the spindle 14 which extends beyond the hub 12 to a distal end of the spindle 14, and accordingly the flat portion 14F may extend from the hub 12 to the distal end of the spindle 14.

The end cap 26 is for being connected to the housing 24 and covers the locking system 30 when it is installed on the housing 24. The end cap 26 is a cylindrical can having an end wall 27 and the end cap 26 can be press-fit into the counterbore 13 of the housing 24. The end cap 26 includes sealing diameter 28 that is part of sidewall having a terminal end 29. A stop collar 35 is spaced from the terminal end 29 of the sealing diameter 28. The stop collar 35 is a mechanical stop that stands proud of the sealing diameter 28. The stop collar 35 prevents the end cap 26 from seating too far into the housing 24. The outer diameter of the stop collar 35 is substantially larger than the diameter of the counterbore 13.

The locking system 30 generally includes a pin 32, a lock washer 34, a nut 36, and a retainer 38. The locking system 30 secures the wheel hub assembly 10 and includes safety features that prevent the nut 36 from spontaneously loosening over time. Loosening of the nut 36 is likely to occur over time due to vibrations as the vehicle travels. An important advance of the safety feature is that it contains a poka-yoke feature. The poka-yoke is a term to mean mistake proof. The poka-yoke is intended to ensure that the safety locking of locking system 30 cannot go uninstalled without obvious notice. This will become clear through the description that follows. The locking system 30 is also efficient and cost-effective as it does not require unusual washers and/or nuts that would be difficult to use. The locking system 30 does not include an inboard nut or an additional outboard, i.e., jam nut.

The pin 32 is positioned within a corresponding receiving hole 39 of the spindle 14 (FIG. 4). As assembled, the pin 32 is located outboard of the retainer 38. The pin 32 may be configured to secure the retainer 38 onto the spindle 14, both axially and rotationally. Therefore, the pin 32 prevents the retainer 38 from moving axially outboard and also prevents the retainer 38 from rotating. The pin 32 may be configured as a cotter pin 32. The pin 32 is typically a metal that retains its shape once it is bent into place to prevent the pin 32 from falling out of the hole 39 to which it is installed. The locking system 30 may or may not include the pin 32. The pin 32 is not critical. As shown, the pin 32 is included to provide redundancy in securing the retainer 38 in conjunction with the lock washer 34. As such, the locking system 30 does not necessarily include the pin 32.

The lock washer 34 is fitted about the spindle 14. The lock washer 34 has a base 40 and a bendable tab 42 that extends outwardly from the base 40. The bendable tab 42 has a distal end 43 that is the farthest point that the bendable tab 42 extends from the base 40. As assembled, the bendable tab 42 wraps around and secures the nut 36 and the retainer 38. The inboard surface of the base 40 engages with the spindle 14, and the outboard surface of the base 40 engages with the nut 36. The lock washer 34 can comprise any desired material, that is capable of holding a shape when bent.

Figure 6:
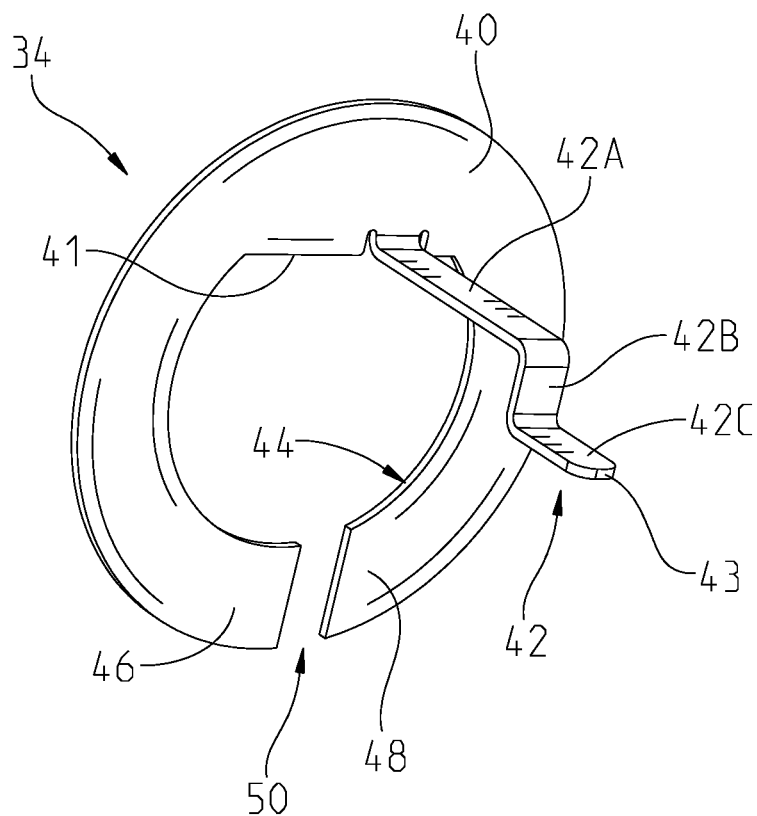
FIG. 6 illustrates a perspective view of the lock washer in an initial unlocked position, which is used during assembly of the wheel hub assembly.
Figure 7:
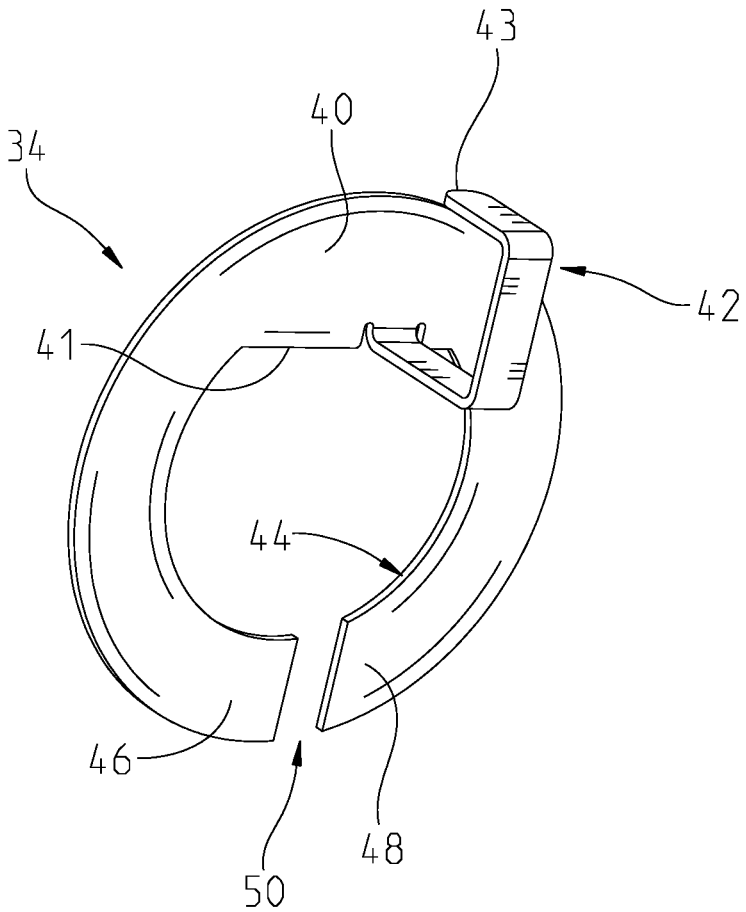
FIG. 7 illustrates a perspective view of the lock washer in a locked position, wherein the tab of the lock washer is bent to secure the wheel hub assembly.

The base 40 of the lock washer 34 can be a substantially annular member but needs a feature to prevent its rotation with respect to the spindle 14 over which it is installed. The hole 44 in the base 40 has a flat edge 41 on a portion of the hole that contacts the flat portion 14F of the spindle 14 when it installed over the spindle. The flat edge 41 acts as an anti-rotation feature that prevents the lock washer 34 from rotating with respect to the spindle 14, when the lock washer 34 is installed onto the spindle 14. The outer periphery of the base 40 can be substantially circular. The inner hole 44 of the base 40 is typically not be threaded and is sized to be a clearance hole for the spindle 14 to extend therethrough. As shown, the inner hole 44 is not threaded (FIGS. 6-7). The inner hole 44 of the base 40 has a size and shape that is complementary with the spindle 14 end section. As shown, the inner hole 44 of the base 40 is a substantially "D"-shaped cross-section because of the flat edge 41. The flat edge 41 of the inner hole 44 engages with the flat portion 14F of the spindle 14 to prevent rotation of the lock washer 34 with respect to the spindle. The flat edge 41 of the hole 44 is located adjacent to the proximal end of the tab 42 connected to the base 40.

Furthermore, the base 40 can be a split member, with a split end, which has arm sections 46, 48 and a cutout 50 therebetween. The cutout 50 can be located opposite of the flat surface of the inner hole 44. The cutout 50 is opposite to the proximal end of the tab 42 for manufacturability because this enables the distal end 43 to be taken from the material that would have otherwise been located at the cutout 50. The cutout 50 and the tab 42 may share a common centerline, which may also be centerline of the lock washer 34 itself. The size and shape of the cutout 50 may correspond to the tab 42. The width of the cutout 50 may match the width of the tab 42. The arm sections 46, 48 may bend or flex relative to one another. The arm sections 46, 48 may assist in gripping and thus securing the lock washer 34 onto the spindle 14.

The tab 42 of the lock washer 34 extends outwardly away from the base 40. The tab 42 may extend substantially perpendicularly from the base 40 nearest to where it is attached to the base 40, e.g., 90 degrees from the base 40 with a reasonable range of manufacturing tolerance. The tab 42 can be unitarily, or monolithically, formed with the base 40. For instance, the tab 42 and the base 40 can initially be a single part. The tab 42 may be cut from the base 40, which simultaneously forms the cutout 50, and thereafter the tab 42 may be bent into its initial unlocked position during manufacture of the lock washer 34. The tab 42 has a proximal end connected to the base 40 and distal end 43. The proximal end of the tab 42 can be located adjacent to the flat edge 41 of the inner hole 44 of the base 40 for efficiency of manufacture, but could be located elsewhere along the base 40. Specifically, the proximal end of the tab 42 is located along the flat edge 41 of the inner hole 44. The bottom surface of the tab 42 can be substantially flush, or aligned with the flat edge 41 of the inner hole 44. It is contemplated that the tab 42 may extend inwardly of the flat edge 41 in the case that a keyway is used in the spindle 14 to receive the tab 42, which is not shown.

Figure 2:
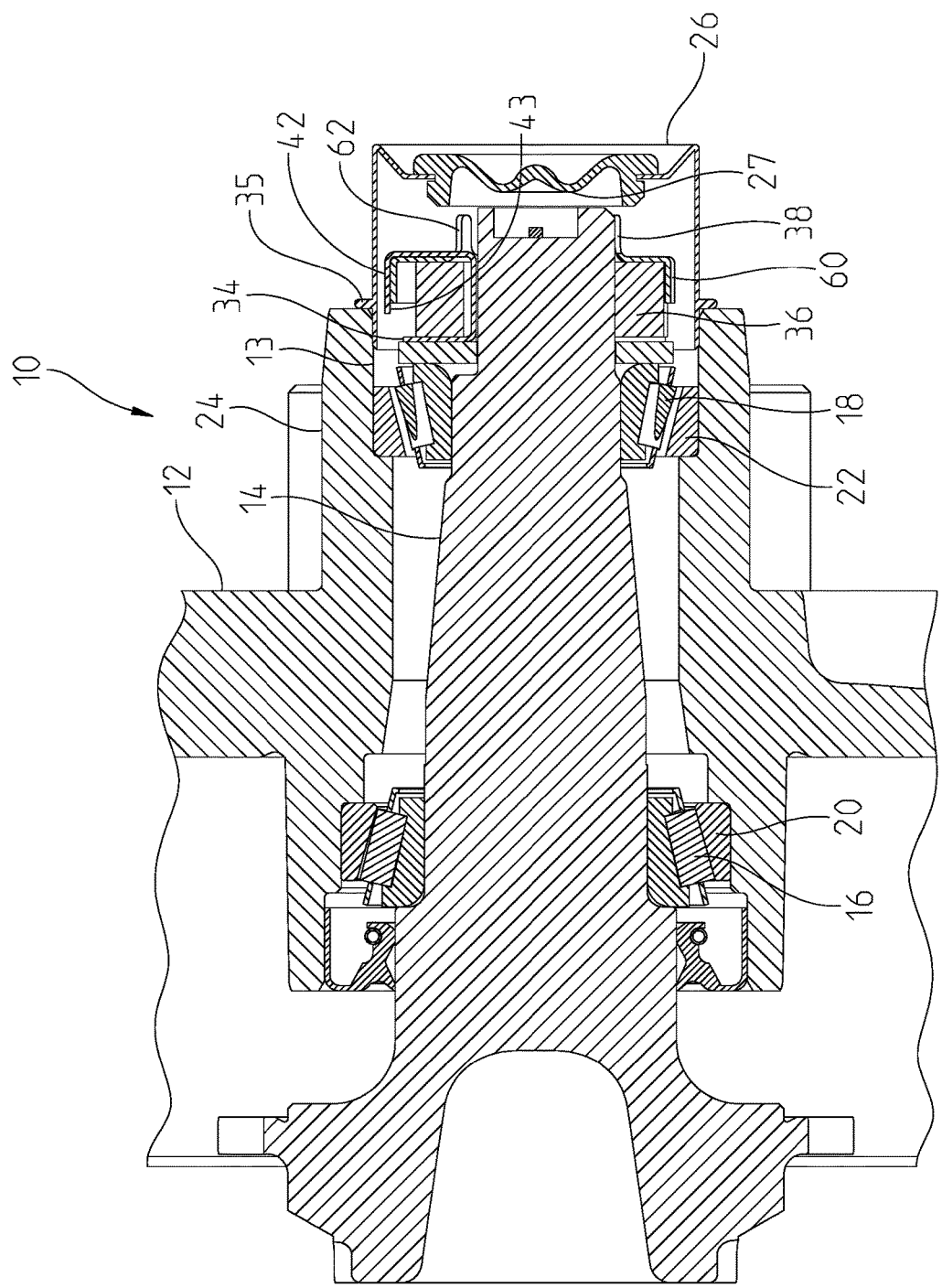
FIG. 2 illustrates a cross-sectional view of the wheel hub assembly in a locked configuration, wherein the tab of the lock washer is bent, taken across line 2-2 of FIG. 1.
Figure 3:
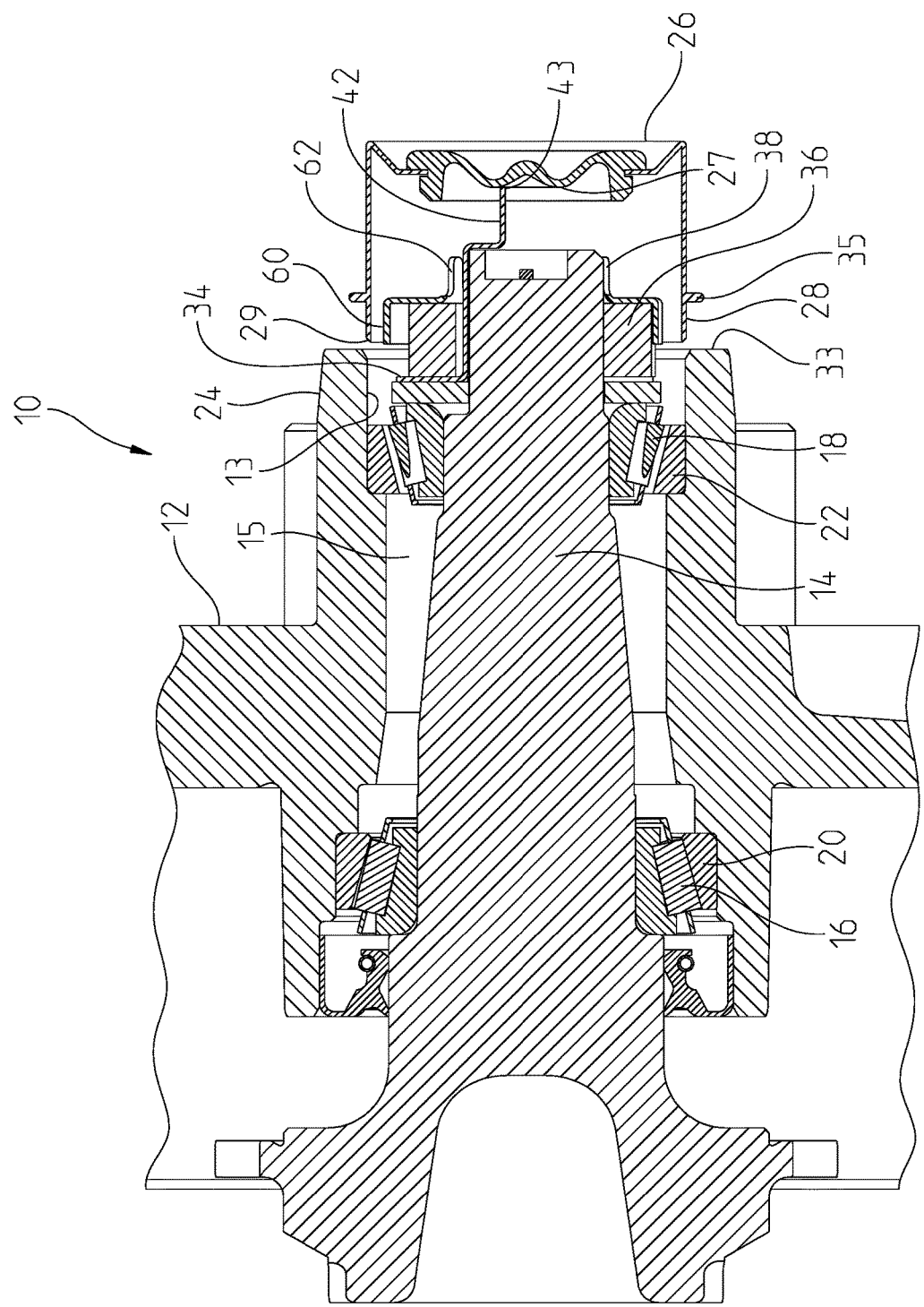
FIG. 3 illustrates another cross-sectional view of the wheel hub assembly, wherein the tab of the lock washer is not bent and unlocked.
Figure 5:
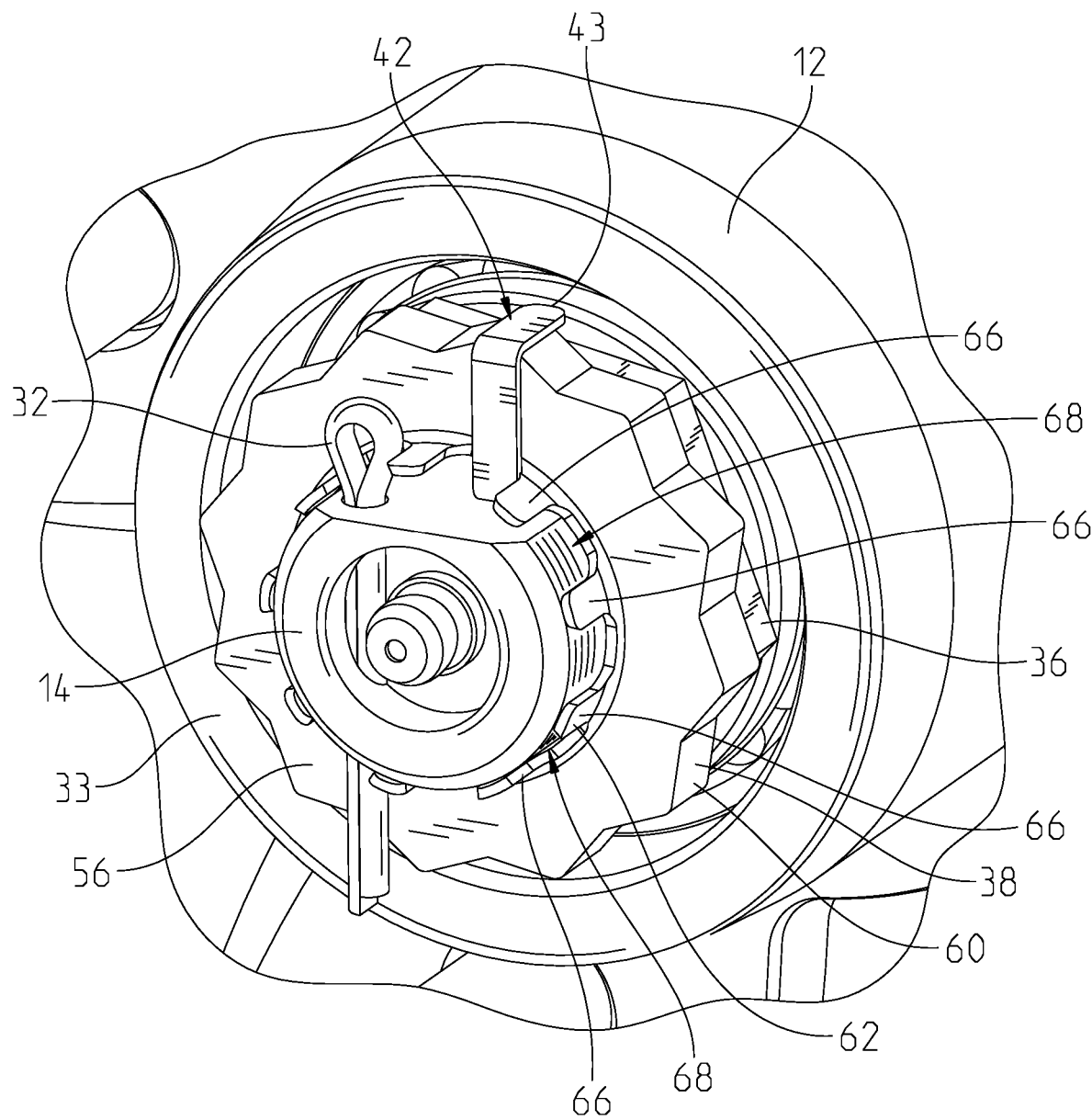
FIG. 5 illustrates a perspective view of the wheel hub assembly without the end cap shown.

Referring to FIGS. 6 and 7, the tab 42 of lock washer 34 has at least two configurations or positions. At the outset, the tab 42 has an initial unlocked position that locates the distal end 43 of the tab 42 at its farthest location from the base 40, this is shown in FIGS. 3 and 6. The tab 42 can be bent to a locked position (FIGS. 2 and 7). In the initial, unlocked position, the tab 42 acts as a poka-yoke, or a safety feature, that prevents the end cap 26 from connecting to the housing 24. This is due to the tab 42 of the lock washer 34 extending outwardly of the spindle 14 so far that the end cap 26 may not be connected to the housing 24 unless the lock washer 34, the nut 36, and the retainer 38 are assembled on the spindle 14 correctly with the tab 42 in the locked position. In the locked position, the tab 42 wraps around the retainer 38 and acts as a mechanical lock that prevents the axial and rotational movement of the retainer 38. Also, in the locked position, since the tab 42 extends back over the retainer 38, it then allows the end cap 26 to be connected to the housing 24 because the tab 42 is out of the way of the end cap 26 so that it may be attached to the hub 12. The tab 42 may be of a sufficient length to that the distal end 43 wraps around enough to contact the flat portion 14F of the spindle 14 when the tab 42 is in its locked position, as shown in FIG. 5.

In the initial unlocked position, the tab 42 may extend substantially perpendicularly to the base 40. The tab 42 of the lock washer 34 extends through the holes of the nut 36 and retainer 38 and also extends outwardly beyond the retainer 38 such that the distal end 43 of the tab 42 contacts the end wall 27 of the end cap 26 (FIG. 3) before the terminal end 29 of the end cap 26 can engage the counterbore 13 of the housing 24. The tab 42 fits in a gap in between the flat portion 14F of the spindle 14 and the nut 36; and the tab 42 fits in a gap between the flat portion 14F and the retainer 38. Since the tab 42 extends so far outwardly, the tab 42 contacts the end wall 27 of the end cap 26 it prevents the end cap 26 from being able to press-fit into the counterbore 13 of the housing 24 (FIG. 3) while the tab 42 is in it is initial extended or unlocked position. This is because when the tab 42 is in its initial position, the distal end 43 of the tab 42 contacts the end wall 27 on its inner surface before the terminal end 29 of the end cap 26 can be inserted into the counterbore 13. In the initial position of the tab 42, the distance the distal end 43 of the tab 42 extends beyond the end surface 33 of the hub 12 is a first distance. The terminal end 29 of the end of the end cap 26 extends to a second distance beyond an inner surface of the end wall 27 in an inboard direction. As such, the end cap 26 cannot reach the counterbore 13 when the tab 42 is in its initial unlocked position. Hence, the user would not be able to seat the end cap 26 in the housing 24 when the tab 42 is in its initial or unlocked position. This relationship is shown in FIG. 3.

In the initial position, the tab 42 may be bent such that the tab 42 comprises a first elongated section 42A that extends outwardly away from the base 40 and elongated section 42A is perpendicular to the base 40 and flush with flat edge 41 of the inner hole 44. A second elongated section 42B of the tab 42 extends inwardly from the first elongated section 42A and is parallel with the base 40. A third elongated section 42C extends outwardly away from the second elongated section 42B and is parallel with the first elongated section 42A, yet offset therefrom. The third elongated section 42C is located radially inward of the first elongated section 42A. In the initial unlocked position, the tab 42 can comprise at least two bends in order to form the first, second, and third elongated sections 42A, 42B, 42C. In this manner, the distal end 43 of the tab 42 is relatively near the longitudinal axis $\Delta$ of the spindle 14 when the lock washer 34 is assembled over the spindle as shown in FIG. 3. The tab 42 sandwiches the nut 36 in between the base 40 and the retainer 38. The tab 42 thereby dually prevents axial sliding and rotation of the nut 36 and the retainer 38.

The user may bend the tab 42 in any desired fashion, thus altering the initial unlocked position as desired, in order to secure the nut 36 and the retainer 38 onto the spindle 14. In all situations, the locked position of the tab 42 has its distal end 43 located inwardly of the initial unlocked and unbent position of the distal end 43. Location of the distal end 43 inwardly of the initial unlocked and unbent position means the distal end 43 is out of the way of the end wall 27 of the end cap 26 so that end cap 26 may only be assembled when the tab 42 is in its locked position.

The nut 36 is fitted about the spindle 14 and is located outboard of the lock washer 34. The nut 36 fits over the tab 42 of the lock washer 34. The nut 36 and has a through hole 52 (FIG. 4). The outer periphery of the nut 36 comprises at least one mechanical locking feature 54 which engages with a corresponding feature of the retainer 38, as discussed in further detail below. The hole 52 of the nut 36, is threaded to engage the spindle 14. The nut 36 may provide the clamping force for securing the lock washer 34 and preloading the bearings 16, 18. The outer periphery of the nut 36 has a hexagonal configuration. Therein, the entire outer periphery of the nut 36 may function as the mechanical locking feature 54.

The retainer 38 is fitted over the spindle 14. The retainer 38 is located outboard of the lock washer 34 and nut 36. The retainer 38 can have a base 56, an inner hole 58 in the base 56, a first locking section 60 in the form of a perimeter wall 63 which extends inboard and over the nut 36, and a second locking section 62 in the form of protrusions 66 that extend outboard from the base 56 opposite of the perimeter wall 63. The protrusions 66 function cooperatively like the castellations on a castellated nut and provide multiple locations for receiving another part such as the locking tab 42 of the lock washer 34. The base 56 and the first and second locking sections 60, 62 can be unitarily formed with one another. The first and second locking sections 60, 62 can be coaxial with one another. The first and second locking sections 60, 62 can have differing diameters. For instance, the second locking section 62 can have a smaller diameter than the first locking section 60. The diameter of the first locking section 60 can be defined by a distance spanning from a center point of the base 56 to an apex in between adjacent flat surfaces of the first locking section 60. The diameter of the second section 62 can be defined by a distance spanning from the center point of the base 56 to an inner surface of the second section 62. The retainer 38 is for complementary engagement with the nut 36, which is shown as a hexagonal shape, but could be other shapes as well such as Torx. As shown, the retainer 38 has a twelve point configuration in the perimeter wall 63 of the second locking section that allows flexible positioning for engagement in multiple orientations with the hex shaped nut 36.

The base 56 of the retainer 38 connects the first and second locking sections 60, 62 together. The base 56 is substantially perpendicular to the first and second locking sections 60, 62. The base 56 defines a flat surface in between the first and second locking sections 60, 62. The inner hole 58 of the base 56 may or may not be threaded. Assembled, the inboard surface of the base 56 of the retainer 38 engages with the outboard face of the nut 36.

The first locking section 60 of the retainer 38 engages with and secures the nut 36. The first locking section 60 prevents rotation of the nut 36 with respect to the retainer 38. The first locking section 60 comprises at least one mechanical locking feature 64 that engages with the at least one locking feature 54 of the outer periphery of the nut 36 (FIG. 4). The locking feature 64 may comprise at least one flat section with a flat surface. As an example, the first locking section can comprise a plurality of flat wall sections with apexes therebetween. The wall sections collectively form the perimeter wall 63, which is perpendicular and extends rearwardly, i.e., inwardly, of the base 56. Therein, the inside surfaces of the entire first locking section 60 may function as the mechanical locking feature 64. The first locking section 60, through its complementary fit with nut 36, acts as an anti-rotation feature between the nut 36 and the retainer 38. As such the retainer 38 is fixed from rotation with respect to the nut 36 when the first locking section 60 engages the nut 36. The first locking section 60 may at least partially extend over and engage with the outer periphery of the nut 36. For instance, the first locking section may cover approximately half of the depth of the nut 36. As assembled, the tab 42 of the lock washer 34 extends over the first and second section sections 60, 62 of the retainer 38 in the locked position of the tab 42. Further, the distal end 43 of the tab 42 engages with the outer periphery of the first locking section, such as one or more of the flat surfaces thereof.

The second locking section 62 comprises a plurality of protrusions 66 and slots 68 therebetween (FIG. 5). The protrusions 66 are perpendicular and extend outwardly or outboard, of the base 56 of the retainer 56. The protrusions 66 extend substantially in an axial direction along and parallel to the longitudinal axis Δ of the spindle 14. The protrusions 66 may or may not be threaded. If the protrusions 66 are not threaded, then they can apply a gripping force onto the spindle 14. If the protrusions 66 are threaded, then the threads of the protrusions 66 can engage with the corresponding threads of the spindle 14. In the present example, the protrusions 66 are threaded. The protrusions 66 are so close to the tab 42 in the assembled condition as shown in FIG. 5, that any slight bending of the tab 42 away from the spindle will cause the tab 42 to engage the protrusions 66. Thus, even if the tab 42 is not bent to its fully locked position, movement of the nut 36 with respect to the spindle 36 will be restricted because the retainer 38 is fixed from rotation with respect to the nut 36 and the tab 42 of the lock washer 34 is restricted with respect to the spindle 14.

As shown in FIG. 5, the pin 32 and the tab 42 of the lock washer 34 (in the locked position) respectively fit in corresponding and adjacent slots 68 of the retainer 38. Thereby, both of the pin 32 and the tab 42 of the lock washer 34 help to secure the retainer 38 onto the spindle 14 and prevent rotation of the retainer 38 with respect to the spindle 14. This also prevents rotation of the nut 36 with respect to the spindle 14 because the retainer 38 is fixed from rotation with respect to the nut 36. Due to the inherent redundancy, if the pin 32 or the lock washer 34 fails, the other will still be secure and retain the retainer 38 by way of mechanical interference between adjacent protrusions 66.

The method of assembly may comprise fitting the lock washer 34 onto the spindle 14. The nut 36 may be fitted onto the spindle 14 and over the tab 42 of the lock washer 34. Then, the retainer 38 may be fitted and threaded onto the spindle 14 such that it extends over the tab 42 of the lock washer 34. In other words, the tab 42 may extend through the semi-circular space, which is created in between flat portion 14F of the spindle 14 and the inner peripheries of the nut 36 and the retainer 38. At this point during assembly, the tab 42 of the lock washer 34 may still be in its initial unlocked position (FIG. 3). Hence, the situation of this assembly generates a poka-yoke because distal end 43 of the tab 42 of the lock washer 34 prevents assembly of the end cap 26 into the counterbore 13. Thereafter, the user may position the lock washer 34 in its locked position (FIG. 2). The tab 42 of the lock washer 34 may be bent upwardly and rearwardly such that the tab 42 engages with the outboard surface of the base 56 and engages the outer periphery of the first locking section 60. The tab 42 can be located in a slot 68 in between adjacent protrusions 66. The pin 32 may then be fitted into the spindle 14. The pin 32 may be located in between adjacent protrusions 66 of the retainer 38. As stated above, even slight bending of the tab 42 will locate the tab in the slots 68. The pin 32 and the tab 42 of the lock washer 34 can be separated by a protrusion 66 of the retainer 38. In other words, the pin 32 and the tab 42 may be positioned within adjacent slots 68 of the retainer 38. It should be appreciated that the pin 32 may be fitted into the spindle 14 before or after the tab 42 of the lock washer 34 is bent into its locked position.

Other embodiments, which differ from the aforementioned embodiments, may be recognized by those skilled in the art without departing from the scope of the following claims.

What is claimed is:

1. A locking system for securing a wheel hub to a spindle, the wheel hub having a housing and bearings, the locking system comprising:
   a lock washer configured for being installed over said spindle, said lock washer including a base having a hole through said base and said base circumscribing said spindle when said lock washer is installed over said spindle, said lock washer including an anti-rotation feature thereon that is for engaging an anti-rotation feature on said spindle, said lock washer being prevented from rotation with respect to said spindle when said anti-rotation feature on said lock washer engages said anti-rotation feature on said spindle, said lock washer including a bendable tab having an initial position corresponding to an unlocked condition and said bendable tab being capable of being bent into a locked position, said bendable tab extending outwardly and substantially perpendicularly from said base at a portion of said tab adjacent to said base;
   a nut configured for coupling to said spindle and being located outboard of said lock washer, said nut being further configured for providing a clamping force for securing said lock washer and preloading said bearings of said wheel hub, said nut including a hole for receiving said spindle and an outer periphery;
   a retainer configured for fitting over said nut, said retainer including a base having a hole, a perimeter wall extending outwardly from said base, and a protrusion extending outwardly from said base opposite of said perimeter wall, said perimeter wall configured for at least partially extending over and engaging with said outer periphery of said nut in a complementary fashion to fix said retainer from rotation with respect to said nut when said perimeter wall engages said outer periphery of said nut; and
   wherein said tab of said lock washer in its said initial position extends between said nut and said spindle when said nut is installed on said spindle and wherein said tab of said lock washer is in its said initial position said washer extends between said retainer and said spindle when said retainer is installed over said spindle, wherein bending said tab away from said spindle and toward said locked position causes said tab to impinge on said protrusion, thereby restraining said rotation of said retainer and rotation of said nut with respect to said spindle, said tab of said lock washer having a distal end being located outboard of an end surface of said hub when said tab is in its said initial position and said distal end of said tab being spaced from said end surface by a first distance, said hub including a counterbore adjacent to said end surface extending into said hub for receiving an end cap that includes an end wall near one end and a terminal end opposite said end wall, an inner surface of said end wall being spaced from said terminal end of said end cap by a second distance, said first distance being greater than said second distance so that when said tab is in said initial position said distal end prevents said terminal end of said end cap from engaging said counterbore of said hub.

2. The locking system of claim 1, wherein said retainer includes a plurality of protrusions forming slots therebetween and said bendable tab of said lock washer is configured for fitting within one of said slots for mechanically interfering with adjacent protrusions and rotationally locking said retainer and said nut.

3. The locking system of claim 2, wherein said anti-rotation feature on said spindle is a flat area being radially inset from a cylindrical area and interrupting said cylindrical area.

4. The locking system of claim 3, wherein said anti-rotation feature on said lock washer is a flat edge within said hole of said base, said flat edge of said hole mating with said flat area on said spindle.

5. The locking system of claim 4, wherein said distal end of said bendable tab may contact said perimeter wall of said retainer in said locked position.

6. A locking system for securing a wheel hub to a spindle, the locking system comprising;
   said hub being rotatably supported on bearings engaging said spindle and said hub circumscribing said spindle, said hub including a counterbore therein and an end surface defining an end of said counterbore;
   said spindle having a cylindrical diameter having threads on a portion thereof and an anti-rotation feature interrupting said cylindrical diameter, said anti-rotation feature having a portion thereof radially nearer a central axis of said spindle than said cylindrical diameter;
   a nut having a hole for being threaded onto said spindle and circumscribing said anti-rotation feature on said spindle, said nut having an outer periphery having an anti-rotation feature;
   a retainer configured for fitting over said spindle, said retainer having a base and a hole therethrough, a perimeter wall extending outwardly from said base and said perimeter wall having an anti-rotation feature for engaging said outer periphery of said nut when a portion of said perimeter wall extends over said outer periphery of said nut and fixing said retainer from rotation with respect to said nut when said perimeter wall engages said outer periphery of said nut, said retainer including a protrusion extending outwardly from said base opposite said perimeter wall;
   a lock washer for being installed over said spindle, said lock washer including a base having a hole therethrough, said base circumscribing said cylindrical portion when installed between said nut and said bearings, said lock washer including an anti-rotation feature within said hole for engaging said anti-rotation feature on said spindle and preventing rotation of said lock washer with respect to said spindle when said anti-rotation feature of said lock washer engages said anti-rotation feature of said spindle, and said base including a bendable tab having an initial position corresponding to an unlocked condition and said bendable tab being capable of being bent into a locked position, said nut proving a clamping force for securing said lock washer and preloading said bearings of said hub, said bendable tab passing between said nut and said spindle, and said bendable tab passing between said retainer and said spindle when said retainer engages said outer periphery of said nut, said initial position of said bendable tab locating a distal end of said bendable tab a first distance beyond said end surface of said hub; and
   an end cap having an end wall connected to a sidewall for being sealingly received into said counterbore of said hub, said sidewall ending at a terminal end extending beyond an inner surface of said end wall a second distance, said second distance being less than said first distance so that said end cap will not engage said counterbore when said bendable tab is in its said initial position.

7. The locking system of claim 6, wherein bending said bendable tab away from said spindle causes said bendable tab to impinge on said protrusion on said retainer.

8. The locking system of claim 7, wherein said retainer includes a plurality of protrusions forming slots therebetween and said bendable tab of said lock washer is configured for fitting within one of said slots for mechanically interfering with adjacent said protrusions and rotationally locking said retainer and said nut.

9. The locking system of claim 8, wherein said anti-rotation feature on said spindle is a flat area being radially inset from said cylindrical area and interrupting said cylindrical area.

10. The locking system of claim 9, wherein said anti-rotation feature on said lock washer is a flat edge within said hole of said base, said flat edge of said hole mating with said flat area on said spindle.

11. A locking system for securing a wheel hub to a spindle, the locking system comprising:
   said hub being rotatably supported on bearings engaging said spindle and said hub circumscribing said spindle, said hub including a counterbore therein and an end surface defining an end of said counterbore;
   said spindle having a cylindrical diameter having threads on a portion thereof and an anti-rotation feature including a portion thereof radially nearer a central axis of said spindle than said cylindrical diameter;
   a nut having a hole for being threaded onto said spindle and circumscribing said anti-rotation feature on said spindle, said nut having an outer periphery having an anti-rotation feature;
   a retainer configured for fitting over said spindle, said retainer having a base and a hole therethrough, a perimeter wall extending outwardly from said base and said perimeter wall having an anti-rotation feature for engaging said outer periphery of said nut when a portion of said perimeter wall extends over said outer periphery of said nut and fixing said retainer from rotation with respect to said nut when said perimeter wall engages said outer periphery of said nut, said retainer including a protrusion extending outwardly from said base opposite said perimeter wall;
   a lock washer for being installed over said spindle, said lock washer including a base having a hole therethrough, said base circumscribing said cylindrical portion when installed between said nut and said bearings, said lock washer including an anti-rotation feature within said hole for engaging said anti-rotation feature on said spindle and preventing rotation of said lock washer with respect to said spindle when said anti-rotation feature of said lock washer engages said anti-rotation feature of said spindle, said base including a bendable tab having an initial position corresponding to an unlocked position and said bendable tab being capable of being bent into a locked position, said nut providing a clamping force for securing said lock washer and preloading said bearings of said hub, said bendable tab passing between said nut and said spindle, and said bendable tab passing between said retainer and said spindle when said retainer engages said outer periphery of said nut, said initial position of said bendable tab locating a distal end of said bendable tab a first distance beyond said end surface of said hub; and an end cap having an end wall connected to a sidewall for being sealingly received into said counterbore of said hub, said sidewall ending at a terminal end extending beyond an inner surface of said end wall a second distance, said second distance being less than said first distance so that said end cap will contact said distal end of said bendable tab when said bendable tab is in its said initial position, thereby preventing said terminal end of said end cap from engaging said counterbore.

12. The locking system of claim 11, wherein bending said bendable tab away from said spindle causes said bendable tab to impinge on said protrusion on said retainer.

13. The locking system of claim 12, said retainer includes a plurality of protrusions forming slots therebetween and said bendable tab of said lock washer is configured for fitting within one of said slots for mechanically interfering with adjacent said protrusions and rotationally locking said retainer and said nut.

14. The locking system of claim 13, wherein said anti-rotation feature on said spindle is a flat area being radially inset from said cylindrical area and interrupting said cylindrical area.

15. The locking system of claim 14, wherein said anti-rotation feature on said lock washer is a flat edge within said hole of said base, said flat edge of said hole mating with said flat area on said spindle.

16. The locking system of claim 15, wherein said bendable tab extends from said flat edge.

* * * * *